US009590259B2

(12) United States Patent
Toida (10) Patent No.: US 9,590,259 B2
(45) Date of Patent: Mar. 7, 2017

(54) FUEL CELL SYSTEM WITH HIGH-POTENTIAL AVOIDANCE CONTROL

(75) Inventor: Masashi Toida, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 366 days.

(21) Appl. No.: 14/359,438

(22) PCT Filed: Nov. 21, 2011

(86) PCT No.: PCT/JP2011/076765
§ 371 (c)(1),
(2), (4) Date: May 20, 2014

(87) PCT Pub. No.: WO2013/076785
PCT Pub. Date: May 30, 2013

(65) Prior Publication Data
US 2014/0295307 A1    Oct. 2, 2014

(51) Int. Cl.
*H01M 8/04*       (2016.01)
*H01M 8/02*       (2016.01)
(Continued)

(52) U.S. Cl.
CPC ......... *H01M 8/04947* (2013.01); *B60L 1/003* (2013.01); *B60L 3/0053* (2013.01); *B60L 11/1803* (2013.01); *B60L 11/1861* (2013.01); *B60L 11/1881* (2013.01); *B60L 11/1887* (2013.01); *B60L 11/1892* (2013.01); *H01M 8/04089* (2013.01); *H01M 8/04313* (2013.01); *H01M 8/04552* (2013.01);
(Continued)

(58) Field of Classification Search
CPC ............ H01M 8/10; H01M 8/00; H01M 8/04; H01M 8/04089; H01M 8/04313; H01M 8/04552; H01M 8/04947; B60L 1/003; B60L 11/1803
See application file for complete search history.

(56) References Cited

U.S. PATENT DOCUMENTS 8,178,251 B2    5/2012  Suzuki et al.
2006/0216555 A1    9/2006  Shige et al.
(Continued)

FOREIGN PATENT DOCUMENTS

EP    2202835 A1    6/2010
JP    2002-203583 A    7/2002
(Continued)

OTHER PUBLICATIONS

Machine Translation of: JP 2010/049827, Ogawa et al., Mar. 4, 2010.*

*Primary Examiner* — Kenneth Douyette
(74) *Attorney, Agent, or Firm* — Andrews Kurth Kenyon LLP (57) ABSTRACT

A fuel cell system comprises: noise detection means for detecting the magnitude of noise in a driver's cabin of a fuel cell vehicle in which the fuel cell system is installed; and a control apparatus for controlling the operation of auxiliary machines. The control apparatus performs high-potential avoidance control to increase electric power consumed by the auxiliary machines so that a power-generation voltage of a fuel cell 1 becomes equal to or lower than a predetermined value, based on noise detected by the noise detection means.

9 Claims, 5 Drawing Sheets (51) Int. Cl.
*B60L 1/00* (2006.01)
*B60L 11/18* (2006.01)
*B60L 3/00* (2006.01)

(52) U.S. Cl.
CPC ....... *B60L 2210/10* (2013.01); *B60L 2240/12* (2013.01); *B60L 2240/36* (2013.01); *B60L 2240/421* (2013.01); *B60L 2270/142* (2013.01); *H01M 8/04007* (2013.01); *H01M 2250/20* (2013.01); *Y02E 60/50* (2013.01); *Y02T 10/642* (2013.01); *Y02T 10/705* (2013.01); *Y02T 10/7044* (2013.01); *Y02T 10/7216* (2013.01); *Y02T 90/32* (2013.01); *Y02T 90/34* (2013.01)

(56) References Cited

U.S. PATENT DOCUMENTS

| | | | |
|---|---|---|---|
| 2009/0024252 A1* | 1/2009 | Aridome | B60K 6/445 700/275 |
| 2010/0003577 A1* | 1/2010 | Eguchi | H01M 8/04201 429/515 |
| 2013/0040219 A1 | 2/2013 | Naganuma et al. | |

FOREIGN PATENT DOCUMENTS

| | | |
|---|---|---|
| JP | 2005-004977 A | 1/2005 |
| JP | 2007-122962 A | 5/2007 |
| JP | 2008-171770 A | 7/2008 |
| JP | 2008-171792 A | 7/2008 |
| JP | 2010-049827 A | 3/2010 |
| WO | 2011135610 A1 | 3/2011 |

* cited by examiner

FUEL CELL SYSTEM WITH HIGH-POTENTIAL AVOIDANCE CONTROL

CROSS-REFERENCE TO RELATED APPLICATIONS

This is a national phase application based on the PCT International Patent Application No. PCT/JP2011/076765 filed Nov. 21, 2011, the entire contents of which are incorporated herein by reference.

TECHNICAL FIELD

The present invention relates to a fuel cell system installed in a fuel cell vehicle.

BACKGROUND ART

In recent years, the development of fuel cell vehicles which travel using electric power supplied from a fuel cell system has been promoted as a countermeasure against the exhaustion of oil resources and global warming. Fuel cell systems installed in such fuel cell vehicles are required to maintain power generation performance for as long a time period as possible without maintenance.

There are various factors that degrade the power generation performance of a fuel cell system. One known phenomenon is for a catalyst to be eluted from a fuel electrode in a cell. If the cell is kept at a high voltage state for a long period of time, part of a platinum catalyst supported on the fuel electrode in the cell melts and becomes unable to function as a catalyst for the fuel electrode. If the catalyst is eluted, the I-V characteristics of the cell will be degraded and the maximum value of electric power that can be generated will thus be decreased.

It has been known that the higher the power-generation voltage of the cell is and the longer the high power-generation voltage state is maintained, the more likely the above catalyst elution is to occur. Thus, in a fuel cell system described in Patent Document 1 below, high-potential avoidance control is performed such that the voltage of a cell is decreased by temporarily increasing power consumption of an auxiliary machine so as not to allow the voltage to exceed a preset upper limit value of the voltage. By performing such high-potential avoidance control, the voltage of the cell is maintained so that it is equal to or lower than the upper limit value, to thereby prevent catalyst elution and achieve a prolonged lifetime for a fuel cell system.

RELATED ART DOCUMENT

Patent Document

Patent Document 1: JP2010-049827 A

DISCLOSURE OF THE INVENTION

Problem to be Solved by the Invention

A specific method for temporarily increasing the power consumption of an auxiliary machine includes, for example, increasing the number of revolutions of a pump installed for supplying fuel and increasing the number of revolutions of a pump for circulating a coolant in order to cool the fuel cell. Thus, in the fuel cell system described in Patent Document 1, when the high-potential avoidance control is performed by temporarily increasing the power consumption of the auxiliary machine, noise in a driver's cabin increases due to the operation noise of the auxiliary machine and comfort in the vehicle is deteriorated.

In addition, increase in the voltage of the cell is likely to occur in a situation in which electric power generated by the fuel cell is in excess, e.g., while the vehicle is traveling down a slope or while the vehicle is stopped. If the high-potential avoidance control is performed in such situation, the operation noise of the auxiliary machine suddenly increases even though an operation such as pressing of an accelerator is not being performed and such sudden noise increase causes the driver to have a feeling of strangeness.

The present invention has been made in light of such problems and an object of the invention is to provide a fuel cell system capable of suppressing a phenomenon in which a catalyst is eluted from a fuel electrode in a cell without increasing the noise perceived by a driver in a driver's cabin of a fuel cell vehicle.

Means for Solving the Problem

In order to solve the problem above, a fuel cell system according to the present invention is a fuel cell system installed in a fuel cell vehicle, the fuel cell system comprising: a fuel cell that receives supply of a fuel gas and air to generate electric power; voltage detection means for detecting a power-generation voltage of the fuel cell; an auxiliary machine that is operated by part of electric power generated by the fuel cell; control means for controlling operation of the auxiliary machine; and noise detection means for detecting a magnitude of noise in a driver's cabin of the fuel cell vehicle, wherein: the control means performs high-potential avoidance control for increasing electric power consumed by the auxiliary machine so that the power-generation voltage becomes equal to or lower than a predetermined value; and the high-potential avoidance control is performed based on the magnitude of noise detected by the noise detection means.

If the operation noise of an auxiliary machine increases when the noise in the driver's cabin is small, a driver will be more likely to perceive the increase in the noise. On the other hand, if the operation noise of the auxiliary machine increases when the noise in the driver's cabin is large, the driver will be less likely to perceive the increase in the noise.

According to the present invention, the fuel cell system includes the noise detection means for detecting the magnitude of noise in the driver's cabin of the fuel cell vehicle. Furthermore, the high-potential avoidance control for increasing the electric power consumed by the auxiliary machine so that the power-generation voltage becomes equal to or lower than a predetermined value is performed based on the magnitude of noise detected by the noise detection means. In other words, the high-potential avoidance control involving the generation of noise, such as the operation noise of motors, is performed based on the detected magnitude of noise.

Thus, by performing the high-potential avoidance control only when the noise in the driver's cabin is large or by performing the high-potential avoidance control while suppressing the generation of noise when the noise in the driver's cabin is small, it is possible to suppress a phenomenon in which a catalyst is eluted from a fuel electrode in a cell while preventing an increase in the noise perceived by the driver.

In the fuel cell system according to the present invention, it is preferable that the smaller the noise detected by the noise detection means, the further the control means suppresses an increase in the electric power consumed by the auxiliary machine when performing the high-potential avoidance control.

In the preferred embodiment, the high-potential avoidance control is performed such that, the smaller the noise detected by the noise detection means, the further the control means suppresses the increase in the electric power consumed by the auxiliary machine, i.e., the increase in the operation noise of the auxiliary machine. Thus, it becomes possible to perform the high-potential avoidance control capable of suppressing the increase in the voltage of the cell to the extent possible, within a scope which does not allow for the driver to perceive the increase in the operation noise of the auxiliary machine.

In the fuel cell system according to the present invention, it is preferable that the fuel cell vehicle further includes speed detection means for detecting a vehicle speed; and the noise detection means detects a magnitude of noise in a driver's cabin based on the vehicle speed detected by the speed detection means.

In the preferred embodiment, the magnitude of noise in the driver's cabin is detected based on the vehicle speed detected by the speed detection means. In general, a speed detection means for detecting a vehicle speed is installed in vehicles. Thus, an additional sensor for directly detecting the magnitude of noise in the driver's cabin does not have to be separately provided and the existing speed detection means can be used to perform the high-potential avoidance control based on the magnitude of noise.

It should be noted that, as an example method for detecting the magnitude of noise in the driver's cabin based on the vehicle speed, the magnitude of noise can be detected by previously obtaining a correlation between the vehicle speed and the noise by way of experiments and then estimating the magnitude of noise corresponding to the vehicle speed detected by the speed detection means based on such correlation.

In the fuel cell system according to the present invention, it is preferable that the control means performs the high-potential avoidance control by calculating a requested power consumption, being electric power required to be consumed by the auxiliary machine, in order to keep the power-generation voltage at equal to or lower than the predetermined value; and controlling an operation of the auxiliary machine such that an actual power consumption, being electric power actually consumed by the auxiliary machine, becomes equal to or higher than the requested power consumption.

In the preferred embodiment, the control means calculates the requested power consumption, being electric power required to be consumed by the auxiliary machine, in order to keep the power-generation voltage at equal to or lower than the predetermined value. In other words, the requested power consumption refers to the minimum electric power required to be consumed by the auxiliary machine in order to keep the power-generation voltage at equal to or lower than the predetermined value. It is possible to accurately perform the high-potential avoidance control by controlling the operation of the auxiliary machine (the power consumption of the auxiliary machine) by, for example, feedback control so that the actual power consumption, being the electric power actually consumed by the auxiliary machine, becomes equal to or higher than the requested power consumption.

In the fuel cell system according to the present invention, it is preferable that the auxiliary machine has fuel supply means for supplying a fuel gas to the fuel cell; and the control means performs the high-potential avoidance control by increasing the amount of supply of the fuel gas from the fuel supply means as needed.

In the preferred embodiment, the high-potential avoidance control is performed by increasing the amount of supply of the fuel gas from the fuel supply means as needed. With such configuration, by increasing, for example, the number of revolutions of a pump included in the fuel supply means, it is possible to increase the electric power consumed by the auxiliary machine and to thereby decrease the voltage of the cell.

It should be noted that a problem in which a polymer electrolyte in the cell will be dried out will not arise, even if the amount of supply of the fuel gas is increased. Rather, back diffusion water from an air electrode to the fuel electrode will be carried to the downstream of the fuel gas and the water content in the entire polymer electrolyte will thus be advantageously brought into uniformity. Therefore, it is possible to increase the power consumption of the auxiliary machine without adversely affecting the power generation performance of the fuel cell.

In the fuel cell system according to the present invention, it is preferable that the auxiliary machine has cooling means for cooling the fuel cell by circulating a coolant and the control means performs the high-potential avoidance control by increasing a speed of circulation of the coolant by the cooling means as needed.

In the preferred embodiment, the high-potential avoidance control is performed by increasing the speed of circulation of the coolant by the cooling means as needed. With such configuration, by increasing, for example, the number of revolutions of a pump included in the cooling means, it is possible to increase the power consumption of the auxiliary machine and to thereby decrease the voltage of the cell.

If there is an increase in the speed of circulation of the coolant, the fuel cell will further be cooled and the temperature of the fuel cell will thus be decreased accordingly. As a result, the I-V characteristics of the fuel cell will be degraded, whereby the voltage of the cell will further be decreased. Accordingly, it is possible to further suppress the elution of the catalyst from the fuel electrode.

In the fuel cell system according to the present invention, it is preferable that the auxiliary machine has air supply means for supplying the air to the fuel cell and the control means performs the high-potential avoidance control by increasing the amount of supply of the air from the air supply means as needed.

In the preferred embodiment, the high-potential avoidance control is performed by increasing the amount of supply of the air from the air supply means as needed. With such configuration, by increasing, for example, the number of revolutions of a pump included in the air supply means, it is possible to increase the power consumption of the auxiliary machine and to thereby decrease the voltage of the cell. Even though the flow rate of the air to be supplied to the fuel cell increases, the air is introduced from the outside and the flow rate thereof can thus be increased without increasing the cost.

In the fuel cell system according to the present invention, it is preferable that it further comprises: a bypass flow path, being a channel that discharges a part of the air supplied from the air supply means to the outside without allowing the part of the air to pass through the fuel cell; and a bypass regulation means for regulating the amount of the air flowing through the bypass flow path, wherein the control means controls the bypass regulation means so as not to change the flow rate of the air reaching the fuel cell when performing the high-potential avoidance control by increasing the amount of supply of the air from the air supply means.

The flow rate of the air to be supplied to the fuel cell is larger than the flow rate of the fuel gas to be supplied to the fuel cell. Thus, a further increase in the flow rate of the air may dry out part of the polymer electrolyte in the cell, thereby deteriorating the power generation performance of the cell.

In the preferred embodiment, the fuel cell system includes the bypass flow path, being a channel that discharges a part of the air supplied from the air supply means to the outside without allowing the part of the air to pass through the fuel cell, and the control means controls the bypass regulation means so as not to change the flow rate of the air reaching the fuel cell when performing the high-potential avoidance control by increasing the amount of supply of the air from the air supply means.

With such configuration, the high-potential avoidance control will not cause any change in the flow rate of the air reaching the fuel cell. Accordingly, it is possible to perform the high-potential avoidance control without drying out the polymer electrolyte of the cell.

In the fuel cell system according to the present invention, it is preferable that the auxiliary machine has: a fuel supply means for supplying a fuel gas to the fuel cell; and a cooling means for cooling the fuel cell by circulating a coolant, wherein the control means performs the high-potential avoidance control by increasing the speed of circulation of the coolant by the cooling means only when the actual power consumption does not become equal to or higher than the requested power consumption even though the amount of supply of the fuel gas from the fuel supply means has been increased.

In the preferred embodiment, when performing the high-potential avoidance control, the control means first attempts to increase the actual power consumption to equal to or higher than the requested power consumption by increasing the amount of supply of the fuel gas from the fuel supply means. Then, the speed of circulation of the coolant by the cooling means is increased only when the actual power consumption does not become equal to or higher than the requested power consumption even though the amount of supply of the fuel gas from the fuel supply means has been increased. In short, the amount of supply of the fuel gas from the fuel supply means is preferentially increased when performing the high-potential avoidance control.

As described above, a problem in which a polymer electrolyte in the cell will be dried out will not arise even if the amount of supply of the fuel gas is increased. Rather, back diffusion water from the air electrode to the fuel electrode will be carried to the downstream of the fuel gas and the water content in the entire polymer electrolyte will thus be advantageously brought into uniformity. Therefore, according to such preferred embodiment, it is possible to perform the high-potential avoidance control by preferentially employing a method which will not adversely affect the power generation performance of the fuel cell.

In the fuel cell system according to the present invention, it is preferable that the auxiliary machine further has air supply means for supplying air to the fuel cell, wherein the control means performs the high-potential avoidance control by increasing the amount of supply of the air from the air supply means only when the actual power consumption does not become equal to or higher than the requested power consumption even though the speed of circulation of the coolant by the cooling means has been increased.

In the preferred embodiment, when performing the high-potential avoidance control, the control means first attempts to increase the actual power consumption to equal to or higher than the requested power consumption by increasing the amount of supply of the fuel gas from the fuel supply means. Then, the speed of circulation of the coolant by the cooling means is increased only when the actual power consumption does not become equal to or higher than the requested power consumption even though the amount of supply of the fuel gas from the fuel supply means has been increased. In addition, only when the actual power consumption does not become equal to or higher than the requested power consumption even though the speed of circulation of the coolant by the cooling means has been increased, the control means increases the amount of supply of the air from the air supply means.

In other words, the control means performs the high-potential avoidance control in the following order of priority—first, increasing the amount of supply of the fuel gas from the fuel supply means, then increasing the speed of circulation of the coolant by the cooling means and finally increasing the amount of supply of the air from the air supply means.

As described above, the increase in the amount of supply of the air from the air supply means may dry out the polymer electrolyte and cause the power generation performance of the cell to deteriorate. In the preferred embodiment, the lowest priority is given to the increase in the amount of supply of the air from the air supply means when the high-potential avoidance control is performed. Thus, it is possible to perform the high-potential avoidance control while preventing the polymer electrolyte from being dried out to the extent possible.

Effect of the Invention

The present invention can provide a fuel cell system capable of suppressing a phenomenon in which a catalyst is eluted from a fuel electrode in a cell without increasing noise perceived by a driver in a driver's cabin of a fuel cell vehicle.

BEST MODE FOR CARRYING OUT THE INVENTION

Embodiments of the present invention will be described below with reference to the attached drawings. In order to aid understanding, the same component is, wherever possible, denoted by the same reference numeral in the drawings, and redundant descriptions thereof will be omitted.

Figure 1:
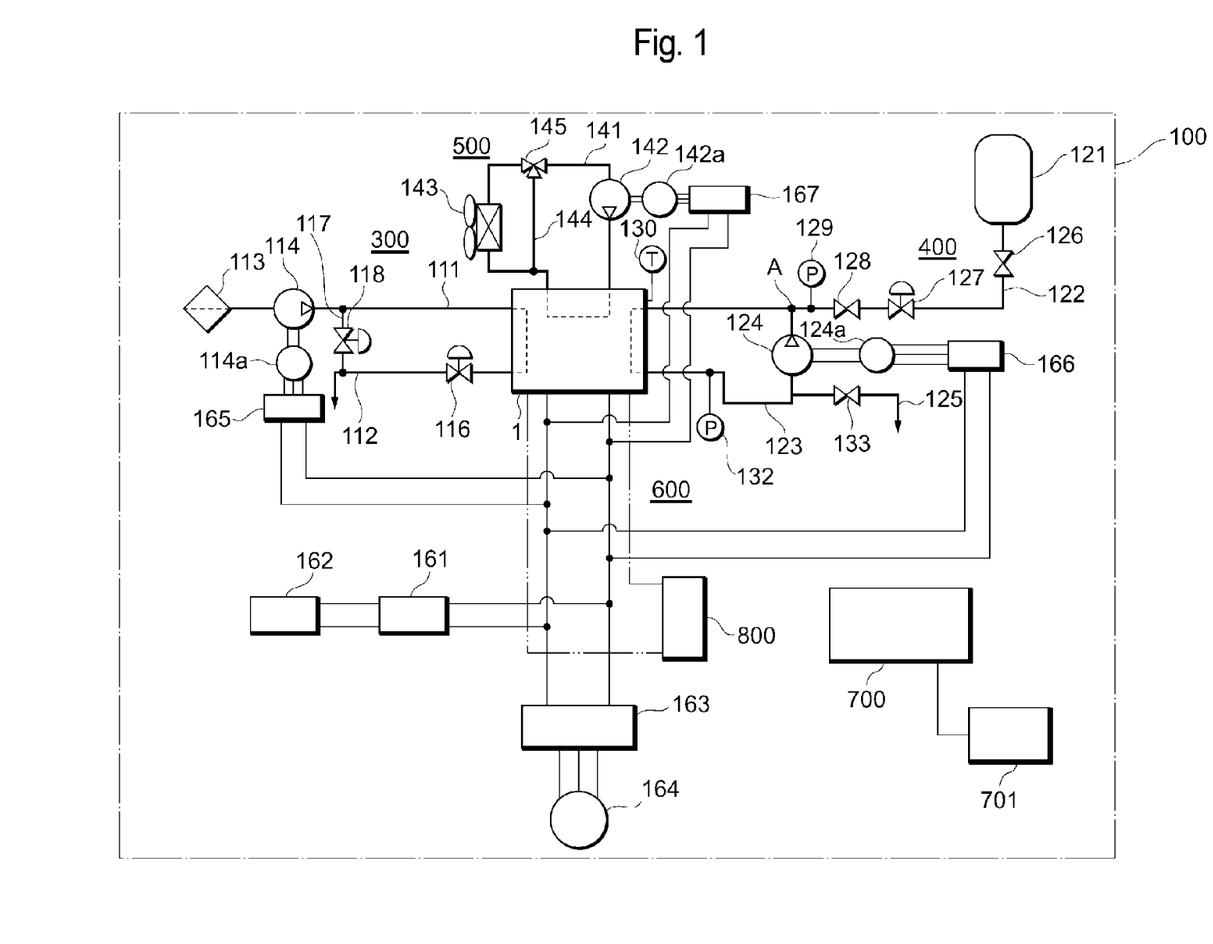
FIG. 1 is a diagram showing a configuration of a fuel cell system according to an embodiment of the present invention.

First, with reference to FIG. 1, a configuration of a fuel cell system according to an embodiment of the present invention will be described below. FIG. 1 is a diagram showing the configuration of the fuel cell system according to an embodiment of the present invention. As shown in FIG. 1, a fuel cell system 100 includes a fuel cell 1, an air supply system 300 which supplies the air to the fuel cell 1, a fuel gas supply system 400 which supplies hydrogen, being a fuel gas, to the fuel cell 1, a coolant supply system 500 which supplies a coolant to the fuel cell 1 to cool the fuel cell 1, a power system 600 which serves as a channel for transferring electric power, and a control apparatus 700 which collectively controls the entire system.

The fuel cell 1 may be, for example, a polymer electrolyte fuel cell constituted by a cell stack with numerous cells (unit cells) stacked in series. Each of the cells has an air electrode on one surface of an electrolyte, which is formed by a polymer ion-exchange membrane, and a fuel electrode on the other surface thereof, with the air electrode and the fuel electrode being sandwiched by a pair of separators. The fuel gas is supplied through a fuel gas flow path formed in one separator and the air is supplied through an air flow path formed on the other separator, and the fuel cell 1 generates electric power through a reaction between the fuel gas and the air. The fuel cell 1 includes a temperature sensor 130 for measuring a temperature of the cell stack.

The air supply system 300 includes a supply path 111 through which the air to be supplied to the fuel cell 1 flows and a discharge path 112 through which an air-off gas discharged from the fuel cell 1 flows. The supply path 111 is provided with a compressor 114 which introduces the outside air via a filter 113. The air-off gas flowing through the discharge path 112 is, after passing through a back pressure regulating valve 116, finally discharged to the atmosphere as an exhaust gas. The compressor 114 introduces the outside air by driving a compressor motor 114a.

The fuel gas supply system 400 includes a fuel tank 121, a supply path 122 through which the fuel gas to be supplied from the fuel tank 121 to the fuel cell 1 flows, a circulation path 123 for returning a fuel-off gas discharged from the fuel cell 1 to a point of merge A on the supply path 122, a pump 124 which pumps the fuel-off gas in the circulation path 123 into the supply path 122, and a discharge path 125 which branches from the circulation path 123.

The fuel tank 121 is a tank for storing a high-pressure hydrogen gas serving as the fuel gas. When a main valve 126 of the fuel tank 121 is opened, the fuel gas flows into the supply path 122. The fuel gas is supplied to the fuel cell 1, after its pressure has been reduced to, for example, 200 kPa, by a pressure regulating valve 127 and other types of pressure reducing valves.

A cutoff valve 128 and a pressure sensor 129 are provided on the upstream of the point of merge A on the supply path 122. The pressure sensor 129 detects the pressure of the fuel gas in the supply path 122. A channel for circulating the fuel gas in the fuel cell system 100 is constituted by a flow path on the downstream of the point of merge A on the supply path 122, the fuel gas flow path formed in the separator of the fuel cell 1 and the circulation path 123. The fuel pump 124 circulates the fuel gas within a circulation system and supplies it to the fuel cell 1 by driving a fuel pump motor 124a.

The circulation path 123 is provided with a pressure sensor 132 for detecting the pressure of the fuel-off gas. The discharge path 125 is provided with a purge valve 133, being a cutoff valve. By opening the purge valve 133 as appropriate during the operation of the fuel cell system 100, impurities in the fuel off-gas are supplied along with the fuel-off gas to a hydrogen diluter (not shown) where it is merged with the air discharged from the discharge path 112 and discharged to the atmosphere. By opening the purge valve 133, the concentration of impurities in the fuel-off gas in the circulation path 123 decreases and the hydrogen concentration in the fuel-off gas to be circulated and supplied to the fuel cell 1 increases.

The coolant supply system 500 includes a coolant circulation flow path 141 which communicates with a coolant flow path in the fuel cell 1, a coolant pump 142 provided in the coolant circulation flow path 141, a radiator 143 which cools the coolant discharged from the fuel cell 1, a bypass flow path 144 which bypasses the radiator 143, and a three-way valve 145 which sets a passage of cooling water into the radiator 143 and into the bypass flow path 144. The coolant pump 142 circulates the coolant within the coolant circulation flow path 141 and supplies it to the fuel cell 1 by driving a coolant pump motor 142a.

The power system 600 includes a high-voltage DC/DC converter 161, a battery 162, a traction inverter 163, a traction motor 164, and various types of auxiliary inverters 165, 166 and 167. The high-voltage DC/DC converter 161 is a direct-current voltage converter which has a function of regulating a direct-current voltage of electric power input from the battery 162 and outputting the regulated voltage to the traction inverter 163, as well as a function of regulating a direct-current voltage of electric power input from the fuel cell 1 or the traction motor 164 and outputting the regulated voltage to the battery 162. These functions of the high-voltage DC/DC converter 161 allow the battery 162 to be charged and discharged. In addition, the high-voltage DC/DC converter 161 controls the output voltage of the fuel cell 1.

The battery 162 has stacked battery cells and provides a certain level of high voltage as its terminal voltage. The battery 162 is capable of being charged with excess power and secondarily outputting electric power, under the control of a battery computer (not shown). The traction inverter 163 converts a direct current to a three-phase alternate current and supplies the resulting three-phase alternate current to the traction motor 164. The traction motor 164 may be, for example, a three-phase alternate-current motor, which serves as a power source for causing a fuel cell vehicle installed with the fuel cell system 100 to travel The auxiliary inverters 165, 166, 167 are motor controllers for controlling the drive of the compressor motor 114a, the fuel pump motor 124a and the coolant pump motor 142a, respectively. The auxiliary inverters 165, 166, 167 each convert a direct current output from the fuel cell 1 or the battery 162 to a three-phase alternate current and supply the resulting three-phase alternate current to the compressor motor 114a, fuel pump motor 124a and coolant motor 142a, respectively. The auxiliary motors 165, 166, 167 may be, for example, pulse-width modulation (PWM) inverters which control the number of revolutions of the compressor motor 114a, fuel pump motor 124a and coolant motor 142a, respectively, in accordance with control instructions from the control apparatus 700.

The control apparatus 700 is constituted by a microcomputer which comprises a CPU, a ROM and a RAM. The CPU executes a desired computation, in accordance with a control program, to perform various types of processing and control. The ROM stores a control program and control data to be processed by the CPU. The RAM is used as various types of work areas, mainly for control processing. The control apparatus 700 performs control by receiving inputs of detection signals from various types of sensors arranged in the fuel cell system 100 and outputting control signals to respective components.

Speed detection means 701 is a speedometer for detecting the vehicle speed of the fuel cell vehicle in which the fuel cell system 100 is installed. The vehicle speed detected by the speed detection means 701 is input to the control apparatus 700.

Voltage detection means 800 is a voltage sensor used for detecting the power-generation voltage of the fuel cell 1. The power-generation voltage of the fuel cell 1 refers to a voltage generated at both ends of the cell stack in a state in which the fuel cell 1 is generating electric power. The power-generation voltage detected by voltage detection means 800 is input to the control apparatus 700.

Figure 2:
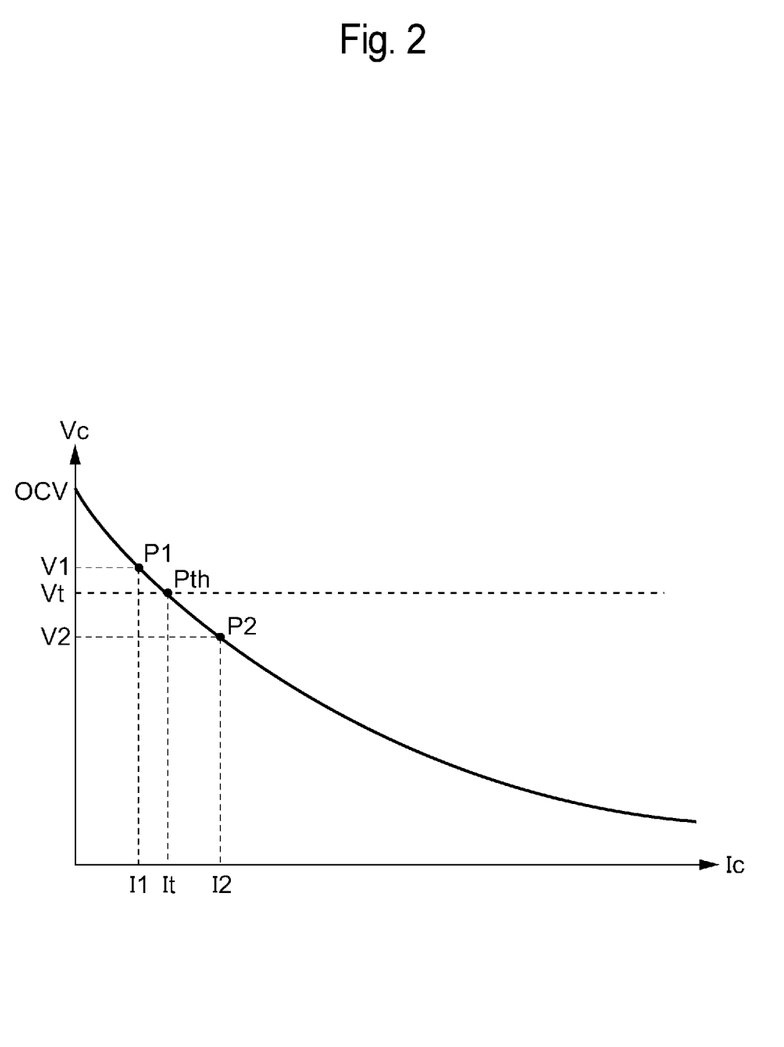
FIG. 2 is a graph explaining the relationship between a current and a voltage in a fuel cell.

Next, high-potential avoidance control in the fuel cell system 100 will be described with reference to FIG. 2. FIG. 2 is a graph explaining the relationship between a current Ic and a voltage Vc in the fuel cell 1, and such relationship is generally referred to as "I-V characteristics." The I-V characteristics vary depending on the temperature Tc of the fuel cell 1, the flow rate of the fuel gas to be supplied to the fuel cell 1 and the flow rate of the air. However, if these conditions are constant, the current Ic and the voltage Vc exhibit a 1:1 relationship, as shown in FIG. 2.

As shown in FIG. 2, the voltage Vc generated at both ends of the cell stack of the fuel cell 1 reaches a maximum (OCV: Open Circuit Voltage) when the current Ic output by the fuel cell 1 is 0 and the voltage Vc decreases in accordance with the increase of the current Ic. This means that the voltage Vc is maintained at a high level in a state in which the electric power output by the fuel cell system 100 is low and the current Ic is small.

It has been known that, if the voltage Vc is maintained at a high level for a long period of time, the catalyst in the fuel electrode will be eluted in each unit cell constituting the fuel cell 1 and that the power generation performance of the fuel cell system 100 will deteriorate. This is because, if the voltage Vc is kept high for a long period of time, part of a platinum catalyst supported on the fuel electrode will melt and become unable to function as a catalyst for the fuel electrode. If the catalyst is eluted, the I-V characteristics of the cell will be lowered and the maximum value of electric power that can be generated will, thus, also be lowered.

It is also known that, the higher the voltage Vc is and the longer a high voltage Vc is maintained, the more likely the above elution of catalyst is to occur. Thus, in order to prevent the catalyst from being eluted, the voltage Vc should be maintained at a low level by causing the current Ic to constantly flow at a predetermined level or higher so that the voltage Vc is prevented from reaching a high level.

For example, as shown in FIG. 2, a predetermined threshold value Vt of the voltage Vc is preset so that, upon detecting a situation in which the voltage Vc is exceeding the threshold value Vt (Vc=V1), the voltage Vc can be decreased by increasing the output of the fuel cell 1. In other words, the voltage Vc can be prevented from reaching a high level by increasing the current Ic from I1 to I2, to thereby decrease the voltage Vc from V1 to V2. In the following description, such control for maintaining the voltage Vc at equal to or lower than the threshold value Vt by controlling the current Ic will be referred to as "high-potential avoidance control".

In order to prevent the electric power (current) output from the fuel cell 1 from decreasing, one conceivable method is to maintain the power consumption of the traction motor 164 at a high level. However, since the traction motor 164 is a power source for causing the fuel cell vehicle to travel, the power consumption thereof is determined by the position of an accelerator in the vehicle, etc. Thus, the power consumption of the traction motor cannot be maintained at a high level or increased, independently of the position of the accelerator, etc., for the purpose of decreasing the voltage Vc.

Another conceivable method is to maintain the voltage Vc at equal to or lower than the threshold value Vt by controlling the high-voltage DC/DC converter 161 so as to maintain the electric power to be supplied from the fuel cell 1 to the battery 162 at equal to or higher than a predetermined level. However, in a state in which the state of charge (SOC) of the battery 162 is high, it is not possible to supply a sufficient amount of electric power to the battery 162 to maintain the voltage Vc at a low level.

Thus, when the SOC is high and the electric power supplied from the fuel cell 1 to the battery 162 cannot, therefore, be maintained at equal to or higher than a predetermined level, the fuel cell system 100 according to the present embodiment performs the high-potential avoidance control by increasing the power consumption of each auxiliary machine. Specifically, the current Ic output from the fuel cell 1 is maintained so as to be equal to or higher than a predetermined level by increasing the number of revolutions of each of the fuel pump motor 124a, the coolant pump motor 142a and the compressor motor 114a to thereby prevent the voltage Vc from exceeding the threshold value Vt.

Figure 3:
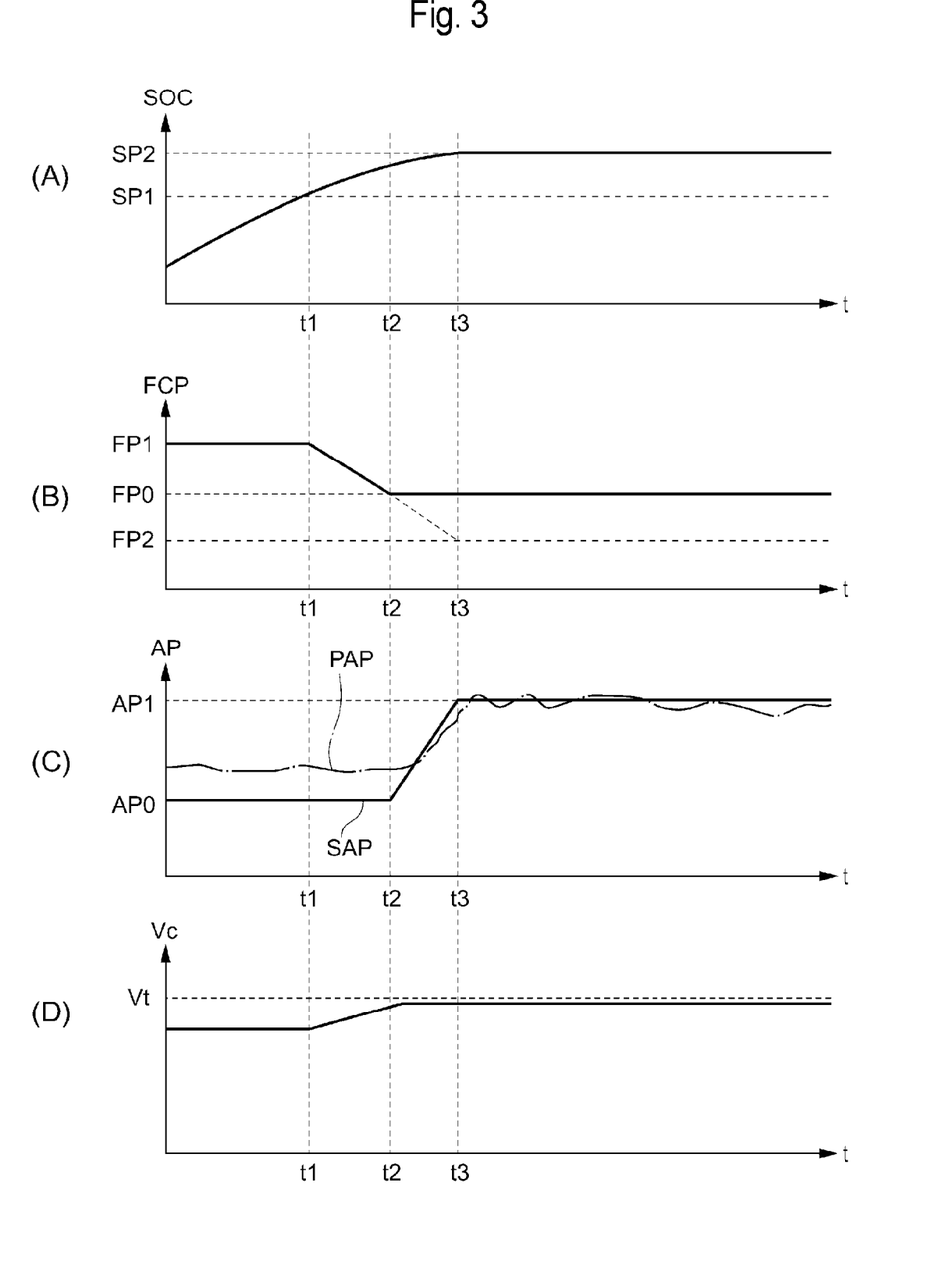
FIG. 3(A) to 3(D) are graphs showing changes over time in various parameters, respectively, during high-potential avoidance control performed by the fuel cell system shown in FIG. 1.

An example of the above-described high-potential avoidance control performed by controlling the power consumption of the auxiliary machines in addition to the electric power to be supplied to the battery 162 will be specifically described with reference to FIGS. 3(A) to 3(D). FIGS. 3(A) to 3(D) are graphs showing changes over time in various parameters, respectively, during the high-potential avoidance control performed by the fuel cell system 100 according to the present embodiment. FIG. 3(A) shows changes over time in the state of charge (SOC) of the battery 162. FIG. 3(B) shows changes over time in output power FCP output by the fuel cell 1. FIG. 3(C) shows changes over time in actual auxiliary power consumption PAP, being electric power actually consumed by an auxiliary machine, and changes over time in requested auxiliary power consumption SAP, being electric power requested to be consumed by an auxiliary machine in order to maintain the voltage Vc at a low level. FIG. 3(D) shows changes over time in the voltage Vc of the fuel cell 1.

The requested auxiliary power consumption SAP is a power value which is constantly calculated by the control apparatus 700 based on the SOC, the output power FCP, etc. An example of the calculation will be described below.

The control apparatus 700 stores a minimum output power Pth, being the minimum electric power required to be output by the fuel cell 1, in order to keep the voltage Vc at equal to or lower than the threshold value Vt. This minimum output power Pth is electric power determined by the I-V characteristics of the fuel cell 1 and calculated as the product of the threshold value Vt set as the upper limit of the voltage Vc and the corresponding current value It, as shown in FIG. 2.

The control apparatus 700 calculates allowable power Pac by adding electric power Pmt consumed by the traction motor 164 to electric power Pba that is able to be supplied to the battery 162. The allowable power Pac corresponds to the electric power that can be consumed by components other than the auxiliary machines in the fuel cell system 100. The control apparatus 700 subtracts the allowable power Pac from the minimum output power Pth and then adds a predetermined margin thereto to thereby calculate the above-described requested auxiliary power consumption SAP.

In FIG. 3(A), since the SOC of the battery 162 is low until a time point t1, a certain amount of electric power is supplied to the battery 162. Thus, the SOC increases, as time passes, and reaches SP1 at the time point t1.

SP1 is a threshold value of the SOC which is provided to judge that the SOC is approaching the upper limit. When the SOC exceeds SP1, the electric power to be supplied to the battery 162 is controlled so as to decrease gradually in accordance with further increase in the SOC. After the SOC reaches SP2, which is set as a higher value than SP1 (at time point t3), the supply of electric power to the battery 162 is stopped.

Since the electric power to be supplied to the battery 162 gradually decreases after the time point t1, the output power FCP of the fuel cell 1 also gradually decreases accordingly, and the output power FCP becomes FP0 at the time point t2. FP0 is a value of electric power which is set by adding a predetermined margin to the minimum electric power required to be output by the fuel cell 1 (minimum output power Pth) in order to keep the voltage Vc at equal to or lower than the threshold Vt.

Since the electric power to be supplied to the battery 162 further decreases from the time point t2 to a time point t3, the output power FCP of the fuel cell 1 will further decrease and reach FP2 at the time point t3, unless some action is taken. In other words, the output power FCP will decrease below FP0, set as described above, and the voltage Vc will thus exceed the threshold value Vt. However, in the present embodiment, the power consumption of the auxiliary machines is increased from the time point t2 to the time point t3, the output power FCP does not decrease after the time point t2 and remains constant at FP0.

Such increase of the power consumption of the auxiliary machines after the time point t2 is performed based on the increase in the above-described requested auxiliary power consumption SA. Since the electric power to be supplied to the battery 162 decreases after the time point t2, the allowable power Pac decreases. Since the requested auxiliary power consumption SAP is obtained by subtracting the allowable power Pac from the minimum output power Pth, the requested auxiliary power consumption SAP will increase as shown in FIG. 3(C), as a result of the decrease in the allowable power Pac.

The control apparatus 700 controls the electric power that is actually consumed by the auxiliary machines (the fuel pump motor 124a, the coolant pump motor 142a and the compressor motor 114a), i.e., the actual auxiliary power consumption PAP, so as to be equal to or higher than the requested auxiliary power consumption SAP. Specifically, when the actual auxiliary power consumption PAP becomes lower than the requested auxiliary power consumption SAP, the control apparatus 700 feeds back a difference (deviation) therebetween to thereby increase the actual auxiliary power consumption PAP to equal to or higher than the requested auxiliary power consumption SAP.

As shown in FIG. 3(C), the actual auxiliary power consumption PAP becomes lower than the requested auxiliary power consumption SAP immediately after the time point t2 when the requested auxiliary power consumption SAP starts to increase. Thus, the control apparatus 700 increases the actual auxiliary power consumption PAP from AP0 to AP1.

As described above, after the SOC of the battery 162 reaches a high level, the actual auxiliary power consumption PAP is increased to thereby prevent the current Ic of the fuel cell 1 from decreasing. Consequently, as shown in FIG. 3(D), the voltage Vc of the fuel cell 1 is maintained so as to be lower than the threshold Vt even after the time point t1 to thereby prevent the elution of the catalyst from the fuel electrode.

In order to increase the electric power actually consumed by the auxiliary machines, the number of revolutions of at least one of the fuel pump motor 124a, the coolant pump motor 142a and the compressor motor 114a has to be increased. However, this will result in the operation noise of the motor(s) also increasing accordingly. In particular, the voltage of the fuel cell 1 is likely to increase when there is an excess amount of electric power generated by the fuel cell 1, e.g., while the vehicle is traveling down a slope or while the vehicle is stopped. If the above high-potential avoidance control is performed in such situation, the operation noise of the auxiliary machine will suddenly increase even though an operation such as pressing an accelerator is not being performed and such sudden noise increase may cause the driver to feel uncomfortable.

Figure 4:
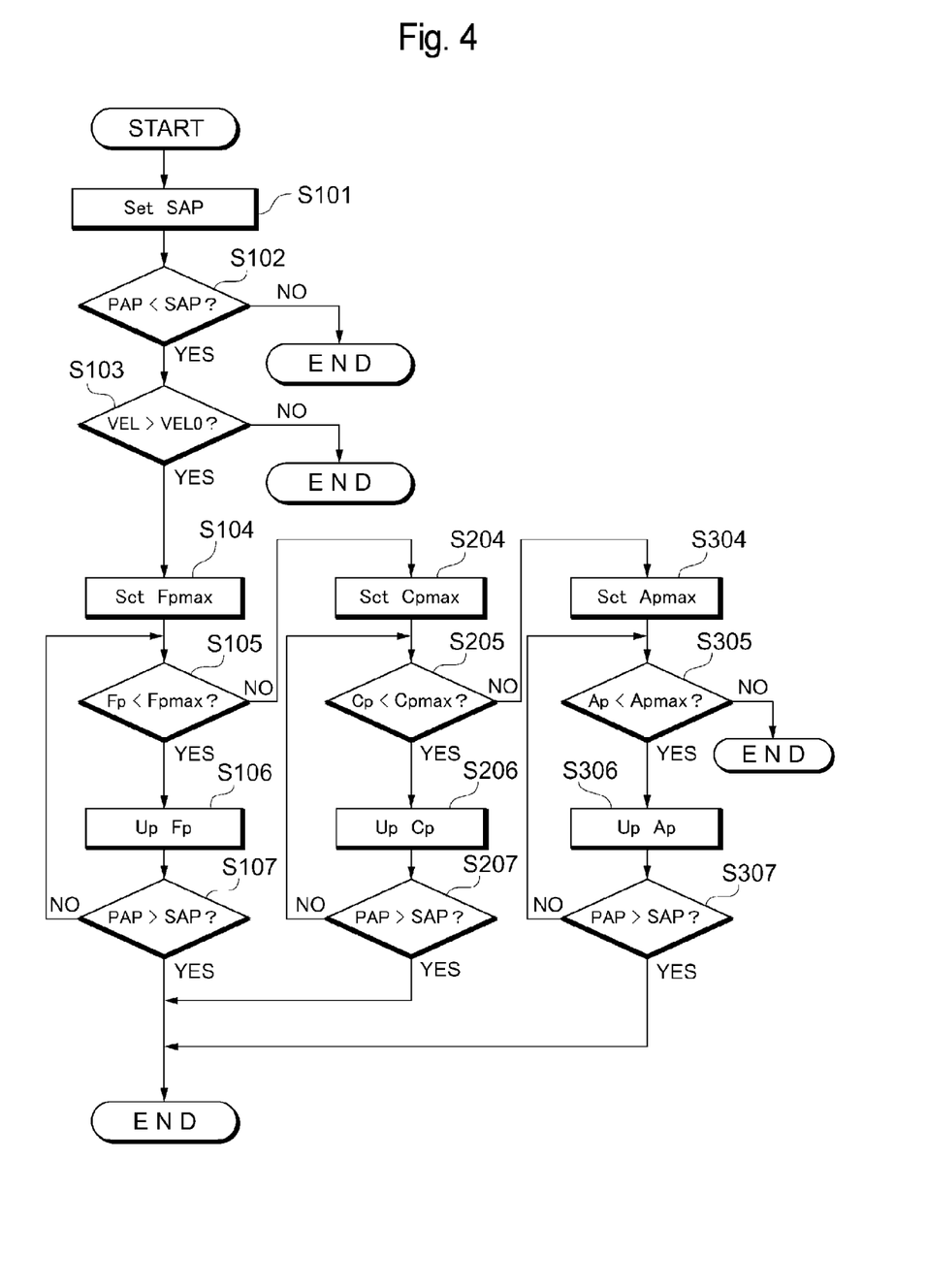
FIG. 4 is a flowchart explaining the high-potential avoidance control performed by the fuel cell system shown in FIG. 1.

In the fuel cell system 100 according to the present embodiment, the high-potential avoidance control is performed based on the magnitude of noise in the driver's cabin of the fuel cell vehicle while paying attention so as not to increase the noise perceived by a driver. Such high-potential avoidance control will be specifically described with reference to FIG. 4. FIG. 4 is a flowchart explaining the high-potential avoidance control according to the present embodiment. A sequence of processing operations shown in FIG. 4 is repeatedly performed by the control apparatus 700 at a predetermined time interval while the fuel cell system 100 is generating electric power.

First, in step S101, a value of the requested auxiliary power consumption SAP is calculated. As described above, the requested auxiliary power consumption SAP is calculated by subtracting the allowable power Pac (calculated in consideration of the SOC, etc.) from the minimum output power Pth and then adding a predetermined margin thereto.

Next, in step S102, the requested auxiliary power consumption SAP is compared with the actual auxiliary power consumption PAP. If the actual auxiliary power consumption PAP is equal to or higher than the requested auxiliary power consumption SAP, it means that a sufficient current Ic is already being output by the fuel cell 1 and the process is thus discontinued as the high-potential avoidance control is not necessary.

If the actual auxiliary power consumption PAP is lower than the requested auxiliary power consumption SAP in step S102, the process proceeds to step S103. In step S103, a judgment is made as to whether or not a vehicle speed VEL detected by the speed detection means 701 is higher than a preset lower-limit vehicle speed VEL0. If the vehicle speed VEL is lower than the lower-limit vehicle speed VEL0, it can be inferred that noise in the driver's cabin of the vehicle is small and the process is thus discontinued and the high-potential avoidance control, performed by increasing the power consumption of an auxiliary machine, will not be performed.

If the vehicle speed VEL is higher than the lower-limit vehicle speed VEL0 in step S103, the process proceeds to step S104. In step S104, a maximum value Fpmax of the number of revolutions FP of the fuel pump motor 124a is set.

In the present embodiment, the maximum value Fpmax is set so as to become larger in proportion to an increase in the vehicle speed VEL. The relationship between the maximum value Fpmax and the vehicle speed VEL is, for example, a proportional relationship, which is appropriately set within a scope which does not allow for a driver to perceive the increase of operation noise by previously obtaining, through experiments, the relationship between the vehicle speed and the operation noise of the fuel pump motor 124a perceived in the driver's cabin.

In step S105, which follows step S104, a judgment is made as to whether or not the number of revolutions Fp of the fuel pump motor 124a is smaller than the maximum value Fpmax. If the number of revolutions Fp of the fuel pump motor 124a is equal to or larger than the maximum value Fpmax, the process proceeds to step S204. In step S204, an attempt will be made such that the actual auxiliary power consumption PAP will be increased by increasing the number of revolutions of the coolant pump motor 142a, as will be described later.

In step S105, if the number of revolutions Fp is smaller than the maximum value Fpmax, the process proceeds to step S106. In step S106, the current number of revolutions Fp is increased by a predetermined amount to a new number of revolutions Fp. In this process, the actual auxiliary power consumption PAP increases in accordance with the increase in the number of revolutions Fp.

In step S107, which follows step S106, the actual auxiliary power consumption PAP is again compared with the requested auxiliary power consumption SAP. If the actual auxiliary power consumption PAP is higher than the requested auxiliary power consumption SAP, it means that a sufficient current Ic is already being output by the fuel cell 1 and the process is thus discontinued at this point and the high-potential avoidance control is terminated.

In step S107, if the actual auxiliary power consumption PAP is equal to or lower than the requested auxiliary power consumption SAP, the process in step S105 is performed again in order to further increase the number of revolutions Fp. The processes in steps S105 to S107 are repeatedly performed as described above until the actual auxiliary power consumption PAP exceeds the requested auxiliary power consumption SAP. However, if the number of revolutions Fp reaches the maximum value Fpmax during such repeated processing (i.e., if the judgment result in step S105 is "No"), the number of revolutions of the fuel pump motor 124a cannot be increased any further and thus the process proceeds to step S204.

In step S204, the maximum value Cpmax of the number of revolutions Cp of the coolant pump motor 142a is set. In the present embodiment, the maximum value Cpmax is set so as to become larger in proportion to an increase in the vehicle speed VEL. The relationship between the maximum value Cpmax and the vehicle speed VEL is, for example, a proportional relationship, which is appropriately set within a scope which does not allow for a driver to perceive the increase of operation noise by previously obtaining, through experiments, the relationship between the vehicle speed and the operation noise of the coolant pump motor 142a perceived in the driver's cabin.

In step S205, which follows step S204, a judgment is made as to whether or not the number of revolutions Cp of the coolant pump motor 142a is smaller than the maximum value Cpmax. If the number of revolutions Cp of the coolant pump motor 142a is equal to or larger than the maximum value Cpmax, the process proceeds to step S304. In step S304, an attempt will be made such that the actual auxiliary power consumption PAP will be increased by increasing the number of revolutions of the compressor motor 114a, as will be described later.

In step S205, if the number of revolutions Cp is smaller than the maximum value Cpmax, the process proceeds to step S206. In step S206, the current number of revolutions Cp is increased by a predetermined amount to a new number of revolutions Cp. In this process, the actual auxiliary power consumption PAP increases in accordance with the increase in the number of revolutions Cp.

In step S207, which follows step S206, the actual auxiliary power consumption PAP is again compared with the requested auxiliary power consumption SAP. If the actual auxiliary power consumption PAP is higher than the requested auxiliary power consumption SAP, it means that a sufficient current Ic is already being output by the fuel cell 1 and the process is thus discontinued at this point and the high-potential avoidance control is terminated.

Figure 5:
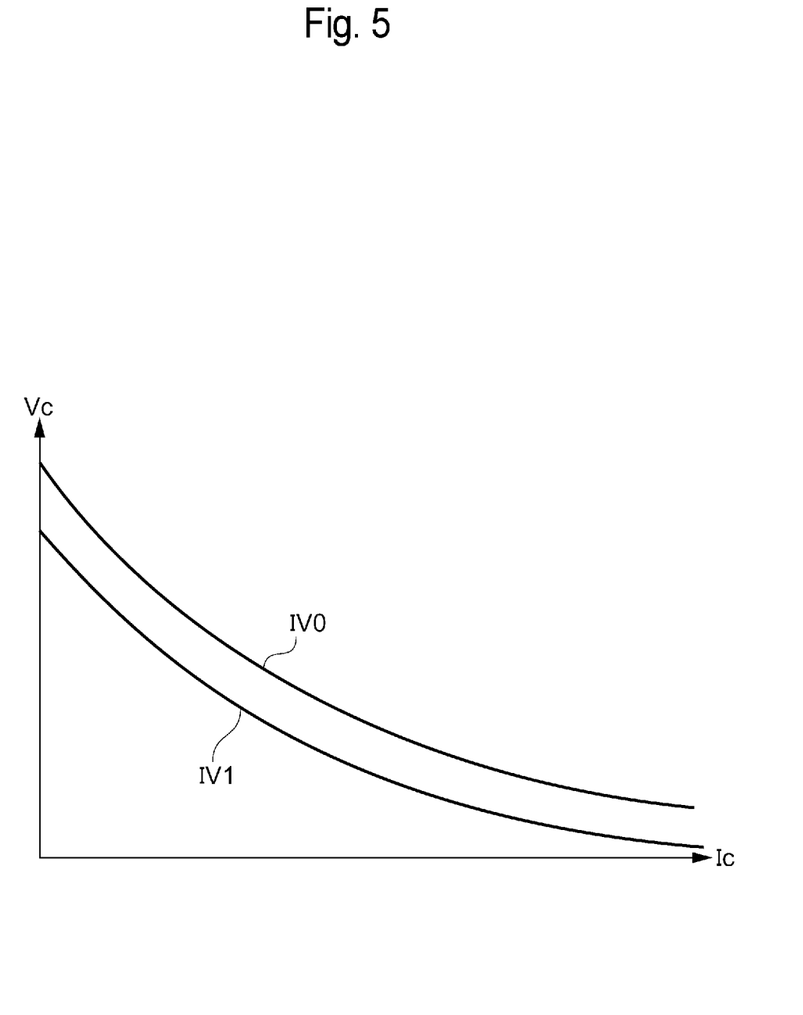
FIG. 5 is a graph explaining how the relationship between a current and a voltage in a fuel cell changes due to temperature.

Changes in the I-V characteristics in accordance with the temperature Tc of the fuel cell 1 will be described with reference to FIG. 5. The I-V characteristics of the fuel cell 1 change in accordance with the temperature Tc of the fuel cell 1, as described above. Specifically, when the temperature Tc is high, the I-V characteristics behave as shown by a curve IV0 in FIG. 5, while, when the temperature Tc is low, the I-V characteristics behave as shown by a curve IV1 in FIG. 5. In short, the curve showing the I-V characteristics moves downward (in the direction in which Vc is lowered) as the temperature Tc is lowered.

When the number of revolutions Cp of the coolant pump motor 142a is increased in step S206, the temperature of the fuel cell 1 will decrease. Thus, the voltage Vc of the fuel cell 1 decreases in accordance with the increase in the current Ic and further decreases in accordance with the downward movement of the curve showing the I-V characteristics. Accordingly, the elution of the catalyst from the fuel electrode can be further suppressed.

In step S207, if the actual auxiliary power consumption PAP is equal to or lower than the requested auxiliary power consumption SAP, the process in step S205 is performed again in order to further increase the number of revolutions Cp. The processes in steps S205 to S207 are repeatedly performed, as described above, until the actual auxiliary power consumption PAP exceeds the requested auxiliary power consumption SAP. However, if the number of revolutions Cp reaches the maximum value Cpmax during such repeated processing (i.e., if the judgment result in step S205 is "No"), the number of revolutions of the coolant pump motor 142a cannot be increased any further and thus the process proceeds to step S304.

In step S304, the maximum value Apmax of the number of revolutions Ap of the compressor motor 114a is set. In the present embodiment, the maximum value Apmax is set so as to become larger in proportion to an increase in the vehicle speed VEL. The relationship between the maximum value Apmax and the vehicle speed VEL is, for example, a proportional relationship, which is appropriately set within a scope which does not allow for a driver to perceive the increase of operation noise by previously obtaining, through experiments, the relationship between the vehicle speed and the operation noise of the compressor motor 114a perceived in the driver's cabin.

In step S305, which follows step S304, a judgment is made as to whether or not the number of revolutions Ap of the compressor motor 114a is smaller than the maximum value Apmax. If the number of revolutions Ap of the compressor motor 114a is equal to or larger than the maximum value Apmax, the power consumption of the auxiliary machine cannot be increased any further and the process is thus discontinued.

In step S305, if the number of revolutions Ap is smaller than the maximum value Apmax, the process proceeds to step S306. In step S306, the current number of revolutions Ap is increased by a predetermined amount to a new number of revolutions Ap. In this process, the actual auxiliary power consumption PAP increases in accordance with the increase in the number of revolutions Ap.

In step S307, which follows step S306, the actual auxiliary power consumption PAP is again compared with the requested auxiliary power consumption SAP. If the actual auxiliary power consumption PAP is higher than the requested auxiliary power consumption SAP, it means that a sufficient current Ic is already being output by the fuel cell 1 and the process is thus discontinued at this point and the high-potential avoidance control is terminated.

In step S307, if the actual auxiliary power consumption PAP is equal to or lower than the requested auxiliary power consumption SAP, the process in step S305 is performed again, in order to further increase the number of revolutions Ap. The processes in steps S305 to S307 are repeatedly performed as described above until the actual auxiliary power consumption PAP exceeds the requested auxiliary power consumption SAP. However, if the number of revolutions Ap reaches the maximum value Apmax during such repeated processing (i.e., if the judgment result in step S305 is "No"), the number of revolutions of the compressor motor 114a cannot be increased any further. In other words, the power consumption of the auxiliary machine cannot be increased any further and the process is thus discontinued.

As described above, in the fuel cell system according to the present embodiment, the magnitude of noise in the driver's cabin of the vehicle is estimated based on the vehicle speed VEL detected by the speed detection means 701 in the fuel cell vehicle. In addition, the high-potential avoidance control is performed by increasing the electric power consumed by the auxiliary machines based on such magnitude of noise.

Specifically, when the noise in the driver's cabin of the fuel cell vehicle is small (i.e., when the VEL is equal to or lower than VEL0), the driver will be more likely to perceive the increase in the noise and the high-potential avoidance control by means of increasing the power consumption of the auxiliary machines will not, therefore, be performed to thereby prevent the increase in the noise from being perceived by the driver. On the other hand, when the noise in the driver's cabin of the fuel cell vehicle is large (i.e., when the VEL exceeds VEL0), the driver will be less likely to perceive the increase in the noise and thus the electric power consumed by the auxiliary machines is increased to perform the high-potential avoidance control.

As described above in relation to steps S104, S204 and S304, when performing the high-potential avoidance control, the control apparatus 700 sets the maximum value Fpmax of the number of revolutions of the fuel pump motor 124a, the maximum value Cpmax of the number of revolutions of the coolant pump motor 142a and the maximum value Apmax of the number of revolutions of the compressor motor 114a so as to become larger in proportion to an increase in the vehicle speed detected by the speed detection means 701.

In other words, the smaller the vehicle speed detected by the speed detection means 701, the further the control apparatus 700 suppresses the increase in the electric power consumed by the auxiliary machines. Thus, it is possible to perform the high-potential avoidance control such that the increase in the voltage of the fuel cell is suppressed to the extent possible within a scope which does not allow the driver to perceive the increase in the operation noise of the auxiliary machines (i.e., such that the electric power of the auxiliary machines is increased to the extent possible).

In addition, the fuel cell system 100 according to the present embodiment comprises the fuel pump motor 124a (fuel supply means) for supplying the fuel gas to the fuel cell 1 and the coolant pump motor 142a that cools the fuel cell 1 by circulating the coolant. The control apparatus 700 performs the high-potential avoidance control by increasing the number of revolutions of the coolant pump motor 142a and increasing the speed of circulation of the coolant only when the actual auxiliary power consumption PAP (actual power consumption) does not reach the requested auxiliary power consumption SAP (requested power consumption) or higher, even though the number of revolutions of the fuel pump motor 124a has been increased in order to increase the amount of supply of the fuel gas.

The fuel cell system 100 further comprises the compressor motor 114a (air supply means) for supplying the air to the fuel cell 1 and performs the high-potential avoidance control by increasing the number of revolutions of the coolant pump motor 142a and increasing the amount of supply of the air only when the actual auxiliary power consumption PAP (actual power consumption) does not each the requested auxiliary power consumption SAP (requested power consumption) or higher, even though the number of revolutions of the coolant pump motor 142a has been increased in order to increase the speed of circulation of the coolant.

In other words, in the high-potential avoidance control, first, by preferentially increasing the amount of supply of the fuel gas by the fuel pump motor 124a (fuel supply means), the high-potential avoidance control is performed by a method capable of making the water content of the entire polymer electrolyte uniform without adversely affecting the power generation performance of the fuel cell 1. Then, by secondly increasing the speed of circulation of the coolant by the coolant pump motor 142a (cooling means), the high-potential avoidance control is performed by a method of efficiently decreasing the voltage Vc by using changes in the I-V characteristics.

It should be noted that, when the number of revolutions of the compressor motor 114a is increased, the amount of supply of the air to the fuel cell 1 is increased. However, the flow rate of the air to be supplied to the fuel cell 1 is larger than the flow rate of the fuel to be supplied to the fuel cell 1. Thus, a further increase in the flow rate of the air may dry out a part of the polymer electrolyte constituting the fuel cell 1 and may thereby cause the power generation performance of the fuel cell 1 to deteriorate. Since the fuel cell system 100 according to the present embodiment has a bypass flow path 117 and a variable valve 118, it is possible to prevent such phenomenon.

Referring back to FIG. 1, the fuel cell system 100 according to the present embodiment includes the bypass flow path 117, being a flow path for discharging a part of the air supplied from the compressor motor 114a to the outside without allowing it to pass through the fuel cell 1. The bypass flow path 117 includes the variable valve 118 for regulating the flow rate of the air passing through the bypass flow path 117.

The control apparatus 700 is capable of, when increasing the number of revolutions of the compressor motor 114a, controlling the flow rate of the air reaching the fuel cell 1 so that it remains unchanged by regulating the degree of opening of the variable valve 118. By performing such control, it is possible to increase the number of revolutions of the compressor motor 114*a* without drying out a part of the polymer electrolyte.

The embodiments of the present invention have been described above with reference to specific examples. However, the present invention is not limited to these specific examples. A person skilled in the art may appropriately add design modifications to the specific examples and such design modifications are also encompassed in the scope of the present invention as long as they include the features of the present invention. For example, the arrangement, material, condition, shape and size of each element included in each of the specific examples above are not limited to those illustrated in the specific examples but may be modified as appropriate. In addition, the elements included in the respective embodiments above may be combined with each other, as long as the combinations are technically possible, and such combinations are also encompassed in the scope of the present invention as long as the combinations comprise the features of the present invention.

DESCRIPTION OF REFERENCE NUMERALS

1: fuel cell
130: temperature sensor
100: fuel cell system
111: supply path
112: discharge path
113: filter
114: compressor
114*a*: compressor motor
116: back pressure regulating valve
117: bypass flow path
118: variable valve
121: fuel tank
122: supply path
123: circulation path
124: fuel pump
124*a*: fuel pump motor
125: discharge path
126: main valve
127: pressure regulating valve
128: cutoff valve
129, 132: pressure sensor
130: temperature sensor
133: purge valve
141: coolant circulation flow path
142: coolant pump
142*a*: coolant pump motor
143: radiator
144: bypass flow path
145: three-way valve
161: high-voltage DC/DC converter
163: traction inverter
164: traction motor
165, 166, 167: auxiliary inverter
300: air supply system
400: fuel gas supply system
500: coolant supply system
600: power system
700: control apparatus
701: speed detection means
800: voltage detection means
Fp, Cp, Ap: number of revolutions
Fpmax, Cpmax, Apmax: maximum value
FCP: output power
Pth: minimum output power
PAP actual auxiliary power consumption
SAP: requested auxiliary power consumption
VEL: vehicle speed
VEL0: lower-limit vehicle speed
Vt: threshold value

What is claimed is:

1. A fuel cell system installed in a fuel cell vehicle, the fuel cell system comprising:
   a fuel cell that receives supply of a fuel gas and air to generate electric power;
   voltage detection means for detecting a power-generation voltage of the fuel cell;
   an auxiliary machine that is operated by part of electric power generated by the fuel cell;
   control apparatus including a microcomputer including a CPU and memory means for controlling operation of the auxiliary machine; and
   noise detection means for detecting a magnitude of noise in a driver's cabin of the fuel cell vehicle, wherein:
   the control apparatus programmed to perform high-potential avoidance control for increasing electric power consumed by the auxiliary machine so that the power-generation voltage becomes equal to or lower than a predetermined value; and
   the high-potential avoidance control is performed based on the magnitude of noise detected by the noise detection means, and
   wherein, as the noise detected by the noise detection means becomes smaller, the control apparatus is programmed to further suppress an increase in the electric power consumed by the auxiliary machine when performing the high-potential avoidance control.

2. The fuel cell system according to claim 1, wherein:
   the fuel cell vehicle further includes speed detection means for detecting a vehicle speed; and
   the noise detection means detects a magnitude of noise in a driver's cabin based on the vehicle speed detected by the speed detection means.

3. The fuel cell system according to claim 1, wherein
   the control apparatus is programmed to perform the high-potential avoidance control by: calculating a requested power consumption, being electric power required to be consumed by the auxiliary machine, in order to keep the power-generation voltage at equal to or lower than the predetermined value; and
   the control apparatus programmed to control an operation of the auxiliary machine such that an actual power consumption, being electric power actually consumed by the auxiliary machine, becomes equal to or higher than the requested power consumption.

4. The fuel cell system according to claim 3, wherein:
   the auxiliary machine has fuel supply means for supplying a fuel gas to the fuel cell; and
   the control apparatus is programmed to perform the high-potential avoidance control by increasing an amount of supply of the fuel gas from the fuel supply means as needed.

5. The fuel cell system according to claim 3, wherein:
   the auxiliary machine has cooling means for cooling the fuel cell by circulating a coolant; and
   the control apparatus is programmed to perform the high-potential avoidance control by increasing a speed of circulation of the coolant by the cooling means as needed.

6. The fuel cell system according to claim 3, wherein:

the auxiliary machine has air supply means for supplying air to the fuel cell; and the control apparatus is programmed to perform the high-potential avoidance control by increasing an amount of supply of the air from the air supply means as needed.

7. The fuel cell system according to claim 6, further comprising:

a bypass flow path, being a channel that discharges a part of the air supplied from the air supply means to outside without allowing the part of the air to pass through the fuel cell; and a bypass regulation means for regulating an amount of air flowing through the bypass flow path, wherein the control apparatus is programmed to control the bypass regulation means so as not to change a flow rate of the air reaching the fuel cell when performing the high-potential avoidance control by increasing the amount of supply of the air from the air supply means.

8. The fuel cell system according to claim 3, wherein the auxiliary machine has: fuel supply means for supplying a fuel gas to the fuel cell; and cooling means for cooling the fuel cell by circulating a coolant, wherein the control apparatus is programmed to perform the high-potential avoidance control by increasing a speed of circulation of the coolant by the cooling means only when the actual power consumption does not become equal to or higher than the requested power consumption even though an amount of supply of the fuel gas from the fuel supply means has been increased.

9. The fuel cell system according to claim 8, wherein the auxiliary machine further has air supply means for supplying air to the fuel cell, wherein the control apparatus is programmed to perform the high-potential avoidance control by increasing an amount of supply of the air from the air supply means only when the actual power consumption does not become equal to or higher than the requested power consumption even though a speed of circulation of the coolant by the cooling means has been increased.

* * * * *

UNITED STATES PATENT AND TRADEMARK OFFICE
CERTIFICATE OF CORRECTION

PATENT NO. : 9,590,259 B2
APPLICATION NO. : 14/359438
DATED : March 7, 2017
INVENTOR(S) : Masashi Toida It is certified that error appears in the above-identified patent and that said Letters Patent is hereby corrected as shown below:

In the Claims

At Column 18, Line 19, change "and memory means for controlling" to "and memory for controlling"

Signed and Sealed this
Fifth Day of June, 2018

Andrei Iancu
*Director of the United States Patent and Trademark Office*